United States Patent [19]

Peterson et al.

[11] 3,765,756

[45] Oct. 16, 1973

[54] SLIDE PROJECTOR

[75] Inventors: Dean McCormack Peterson, Littleton, Colo.; Cornelis T. Veenendaal, Milwaukie, Oreg.

[73] Assignee: Honeywell Inc., Minneapolis, Minn.

[22] Filed: Aug. 14, 1970

[21] Appl. No.: 63,751

[52] U.S. Cl. .................................. 353/83, 353/93
[51] Int. Cl. ........................................... G03b 23/16
[58] Field of Search .................. 353/21, 22, 83, 85, 353/90, 93, 86, 82

[56] References Cited
UNITED STATES PATENTS

| | | | |
|---|---|---|---|
| 2,031,361 | 2/1936 | Bowen | 352/133 |
| 2,120,596 | 6/1930 | Avey | 363/21 |
| 1,141,885 | 6/1915 | Palmer | 353/83 |
| 3,514,198 | 5/1970 | Schacht | 353/21 |

Primary Examiner—Louis R. Prince
Assistant Examiner—A. J. Mirabito
Attorney—Arthur H. Swanson, Lockwood D. Burton and John Shaw Stevenson

[57] ABSTRACT

A projector comprised of No. 1 a unitary optical system, No. 2 a means for providing a first and a second light beam each having a separate axes that extends through a different one of two optical objects, No. 3 a movable first and second light beam directing means jointly coacting simultaneously to replace by infusion a projected image of one of said optical objects being projected onto a show screen with the projected image of the other optical object and additional light reflecting means associated with the light directing means that are operable to infuse the image of additional optical objects as they are projected onto a preview screen of the projector and before they are projected onto its show screen.

4 Claims, 18 Drawing Figures

INVENTOR.
DEAN McCORMACK PETERSON
CORNELIS T. VEENENDAAL
BY John Shaw Stevenson
AGENT.

INVENTOR.
DEAN McCORMACK PETERSON
CORNELIS T. VEENENDAAL
BY
John Shaw Stevenson
AGENT.

SLIDE PROJECTOR

The present invention relates to projectors that are selectively operable to project the image of one or the other of two photographic slides on a viewing screen and to provide a unique transition by infusion from the projection of the one photographic slide to the other.

Heretofore, slide projectors have been developed which are capable of producing a wipe, or line lap, transition from one photographic slide to another. In one form of slide projector of this type, a line lap transition is accomplished by providing shutters to alternately cut the light at the film planes of one or the other of two photographic slides. The line lap type of projector has its short comings because a person viewing the screen can become distracted because he must repetitiously observe a distinct dividing line moving across a viewing screen each time the image of one photographic slide is replaced by another on a viewing screen.

Other lap dissolve type projectors use two separate slide projectors, in which the intensity of the light source of one slide projector is decreased while the light source of an adjacent slide projector is simultaneously illuminated and then increases in intensity. Alternately, lap dissolve has been accomplished by using a two projector arrangement to simultaneously close off the light aperture of one slide projector while opening the light aperture of the other slide projector. An obvious disadvantage with these prior arrangements for producing lap dissolve is that the intensity changes that take place in the projected image are distracting to the viewer and they are unduly complicated and expensive since they require two slide projectors along with apparatus for simultaneously controlling each of the slide projectors.

It is therefore an object of the present invention to provide a novel slide projector capable of producing a transition from one photographic slide to another by infusion that will continuously maintain the projected image at the same intensity and which will therefore not introduce any of the aforementioned undesired distracting features to the viewer in going from one photographic slide to another.

It is another object to provide a projector that is easier to operate and less expensive to manufacture than other presently available projectors.

It is further an object of the present invention to provide a novel slide projector as set forth which incorporates novel light directing means for accomplishing a transition by infusion from one of the previously mentioned projected slides to the other.

It is also an object of the present invention to provide a novel modified form of the aforementioned slide projector which includes means for successively previewing slides by infusing the slide to be previewed with slide that is being removed from its preview position.

It is another object of the present invention to provide a unique slide projector which is capable of selectively projecting the image of a photographic slide on a viewing screen and removing it therefrom while an image of another slide is employed to replace the first slide by infusion or, in other words, by a process in which the image of the second slide completely replaces the overall surface occupied by the first image as the latter is being removed.

It is, additionally, an object of the present invention to provide novel light directing means which defines an unobstructed constant length light path.

In accomplishing these and other objects, there has been provided in accordance with the present invention a slide projector having a light source means. First and second condensing lens systems are included for forming first and second light beams from light radiating from the light source means. First and second slide receiving compartments forming gates are included for supporting first and second optical objects such as photographic slides in the respective paths of the first and second light beams. First and second movable mirror means having beveled edges are provided for selectively directing light from the first and second slides, respectively, to a projecting lends system. Each movable mirror means selectively defines an unobstructed constant length light path between the respective slide compartment and the projecting lens system. Positioning means are also included for simultaneously positioning the first and second movable mirror means, thereby to produce a unique infusion type of transition during the projection of one slide to the other. Previewing means are, in addition, provided for previewing the next slide to be projected.

It is another object of the invention to disclose a modified form of the aforementioned projector in which the vertical motion of mirrors that are angularly displaced from one another and in different planes are utilized as the light beam directing means to not only project one of the two optical objects on a shown screen but to also simultaneously project the other remaining object on a preview screen.

A better understanding of the invention may be had from the following detailed description when read in connection with the accompanying drawings in which:

FIG. 14 shows an alternate form of the slide projector shown in FIG. 11.

Referring to FIGS. 1 – 4 in more detail, there is shown a first embodiment of the invention in an exemplary slide projector 100. The basic elements of the projector 100 are shown mounted in a projector housing 1, the housing being represented by broken lines. A light source, such as a lamp 2, is centered at the rear portion of the housing 1. The lamp 2 has a filament 44. First and second light condensing lens systems are symmetrically positioned to the right and left sides of the lamp 2. Each condensing lens system includes a lens 3, a mirror 4 and a lens 5. The optical elements of the right and left hand, as viewed in the drawings, condensing lens system are identified, respectively, by the suffixes R and L. In each condensing lens system the optical axes of the lenses 3 and 5 are substantially at right angles with respect to each other and the mirror 4 is positioned at an angle of 45° with respect to these axes so as to direct light from the lens 3 to the lens 5. For the purposes of the specification and the associated claims, the optical axis of each condensing lens system is defined as being coincident with the axis of the lens 5.

Positioned immediately adjacent the lenses 5R and 5L, respectively, are slides receiving compartments 6R and 6L. Photographic slides 7R and 7L are shown placed in the slide receiving compartments 6R and 6L, respectively. The slides 7R and 7L are respectively positioned by the compartments 6R and 6L across and perpendicular to the axis of the respective condensing lens systems. For the purposes of illustration, the slide 7R carries only the picture of a CIRCLE while the slide 7L carries only the picture of a CROSS.

Positioned beyond the slide receiving compartment 6R and along the axis of the right hand condensing lens system is a movable mirror means 8R. In a similar manner, a movable mirror means 8L is positioned beyond the slide compartment 6L. The mirror means 8R comprises a frame member 9R with slots 15R and 16R formed in the member 9R to provide guide means. Fixed pins 17R and 18R are mounted on the housing 1 and the frame member 9R is positioned on the housing 1 so that the slots 15R and 16R receive the pins 17R and 18R, respectively. Thereby, a straight line of travel along the axis of the right hand condensing lens system is defined for the mirror means 8R. Mounted on the end of the frame member 9R nearest the slide compartment 6R is a mirror 19R having a plane reflecting surface. The mirror 19R is mounted with its reflecting surface at a 45° angle with respect to the axis of the lens 5R. Gear teeth 20R are formed along the side of the frame member 9R facing towards the center line of the projector. A spring 21R is attached between the housing 1 and the end of the frame member 9R remote from the mirror 19R. The spring 21R takes the play or slack out of the movement of the movable mirror means 8R.

A movable mirror means 8L is constructed as a mirror-image of the mirror means 8R for mounting on the left side of the housing 1, but otherwise corresponds with the mirror means 8R. The reference numbering of the mirror means 8L and its associated elements corresponds with that for the mirror means 8R, except that the suffix L is used instead of the suffix R.

Mounted to be movable across the center line of the projector 100 and between the movable mirror means 8R and 8L is a movable mirror means 25. The mirror means 25 comprises a frame member 26 with slots 27 and 28 formed therein to provide guide means. Fixed pins 29 and 30 are mounted on the housing 1. Frame member 26 is positioned on the housing 1 so that the slots 27 and 28 receive the pins 29 and 30, respectively. Thereby, a straight line of travel perpendicular to the axes of the left and right hand condensing lens systems is defined for the mirror means 25. Mounted on the frame member 26 are mirrors 31R and 31L each of which has a plane reflecting surface. The mirrors 31R and 31L are positioned adjacent to each other on the right and left sides, respectively, of the frame member 26 with their reflecting surfaces facing away from each other. The reflecting surfaces of the mirrors 31R and 31L are perpendicular with respect to each other. The reflecting surface of the mirror 31R faces and is parallel with the reflecting surface of the mirror 19R. Similarly, the reflecting surface of the mirror 31L faces and is parallel with the reflecting surface of the mirror 19L. Gear teeth 32 are formed along the side of the frame member 26 nearest the gear teeth 20R and 20L.

Positioning means comprised of a gear 35 and selectively operable drive means 36 are shown for simultaneously positioning the mirrors 19R, 31R, and 31L. The gear 35 is pivotally mounted for rotation on the housing 1 to engage the teeth 20R, 20L and 32 of the frame members 9R, 9L and 26, respectively. The drive means 36 may be a manually operated crank, an electric motor, or other conventional means for driving the gear 35.

Positioned above the gear 35 along the center line of the projector 100 is a conventional projecting lens system 38. The lens system 38 is mounted on the housing 1 so that its axis is parallel with and lies substantially in a common plane with the axis of the right hand and left hand condensing lens systems. The dash lines 42 indicate the effective light path defined by the lens system 38 for projected light. The dash line 43 indicates the node of the lens system 38. The node 43 is the narrowest position of the effective light path defined by the lens system 38.

In operation, light from the lamp 2 is collected by the lenses 3R, 3L and formed by the respective condensing lens systems into converging light beams 40R, 40L. The function of each condensing lens system is to deviate light from the lamp 2 inward so that light directed to the projecting lens system 28 just fills the effective light aperture or window of the projecting lens system 38 38 and is projected therethrough. The slides 7R and 7L are illuminated by the respective light beams 40R and 40L. Since the slides 7R and 7L are located immediately adjacent the lenses 5R and 5L, light from substantially all points on the filament 44 illuminates every point on each of the slides.

Figure 1:
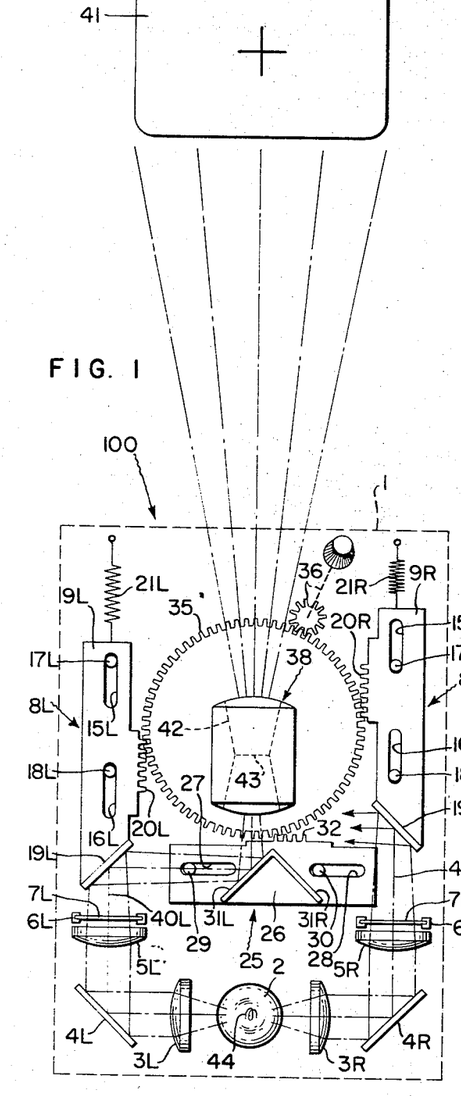
FIGS. 1 – 4 are top views of a first embodiment of a slide projector according to the present invention.

In FIG. 1, the mirror 19L is positioned in-line with the mirror 31L and the mirror 31L is positioned across the axis of the projecting lens system 38. Therefore, substantially all the light transmitted from the slide 7L is reflected by the mirrors 19L and 31L to the projecting lens system 38. The projecting lens system 38 is focused so as to form an image of the slide 7L on a viewing screen 41. Hence, the CROSS on the slide 7L is projected onto the screen 41. In FIG. 1, no light from the right hand condensing lens system is being directed to the viewing screen 41 since the lens 19R is positioned out-of-line with respect to the lens 31R, and the lens 31R is positioned to the right side of the projector, out-of-line with the projecting lens system 38.

As is hereinafter discussed, the mirrors 19L, 31L and the mirors 19R, 31R each selectively define unobstructed, constant, equal length light paths between their associated slide receiving compartments 6 and the projecting lens system 38. The left and right condensing lens systems are each designed for these constant equal length light paths so that light selectively transmitted from the slides 7L, 7R just fills the node 43 of the projecting lens system 38, and an image of the filament 44 of the lamp 2 is formed thereat.

Figure 2:
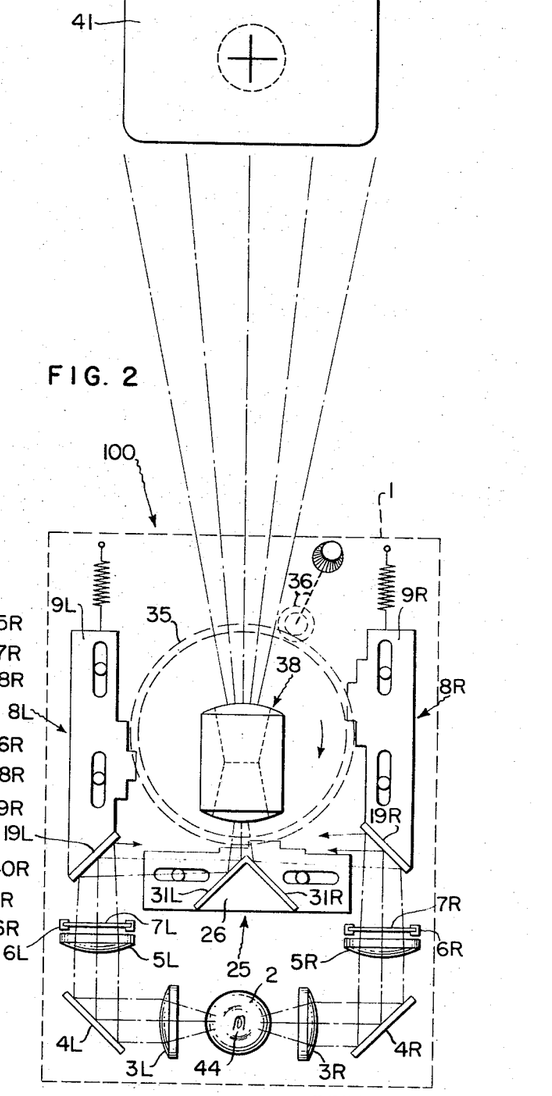

In FIG. 2, the gear 35 is shown as having been rotated clockwise by means of the driving means 36 in order to resposition the frame members 9L, 9R and 26. Thereby, the mirrors 19L, 31L and 19R, 31R have been repositioned along lines of travel at right angles with respect to each other. The mirror 19L has been moved away from the slide 7L, slightly out-of-line with the mirror 31L, while the mirror 19R has been moved toward the slide 7R, partially in-line with the mirror 31R. At the same time, the mirrors 31L and 31R have been moved to the left so that the mirror 31L is slightly out-of-line with the projecting lens system 38 while the mirror 31R is partially in-line therewith. The result of this right angled movement of the mirrors 19L, 31L and 19R, 31R is that the image of the CROSS commences to be removed on the viewing screen 41 while the image of the CIRCLE on the slide 7R commences to appear in an infused manner on the screen 41. In FIG. 2, the CROSS is shown solid and the CIRCLE is shown in broken lines on the screen 41 to indicate that the CROSS is being removed and the CIRCLE is being infused thereon.

Since the mirrors 19L, 31L and 19R, 31R are each moved equal distances along their respective lines of travel, the perpendicular distance between the planes of the reflecting surfaces of the mirrors 19L, 31L and the mirrors 19R, 31R each remain constant. Therefore, the lengths of the aforementioned light paths defined by the mirrors 19L, 31L and the mirrors 19R, 31R are maintained. constant. As a consequence, the images of the CROSS and the CIRCLE stay in focus on the screen 41 as th mirrors 19L, 31L and 19R are positioned relative to each other.

Figure 3:
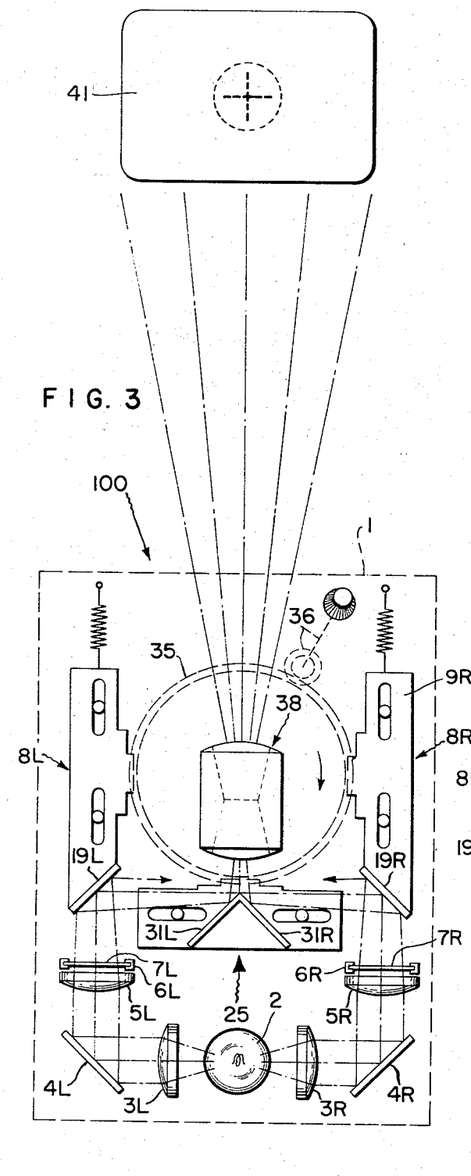

In FIG. 3, the gear 35 is shown as having been rotated further clockwise so that the mirrors 31L and 31R are positioned respectively, to the left and right of the axis of the projecting lens system 38. The mirror 19L has been moved away from the slide 7L so that it is now substantially half in-line and half out-of-line with respect to the mirror 31L. At the same time, the mirror 19L has been moved toward the slide 7R so that it is also now substantially half in-line and half out-of-line with respect to the mirror 31R. In this manner a change occurs in the light directed from the slide 7L to the viewing screen 41. At the same time an opposite change in light that is directed from the slide 7R to the viewing screen 41 with the result that the images of the CROSS and CIRCLE formed on the screen 41 are continuously maintained at equal intensity. The CROSS and CIRCLE have both been shown in dash lines in FIG. 3 to indicate the their images are of equal intensity during the time in which the circle image is being infused on the image of the cross.

Figure 4:
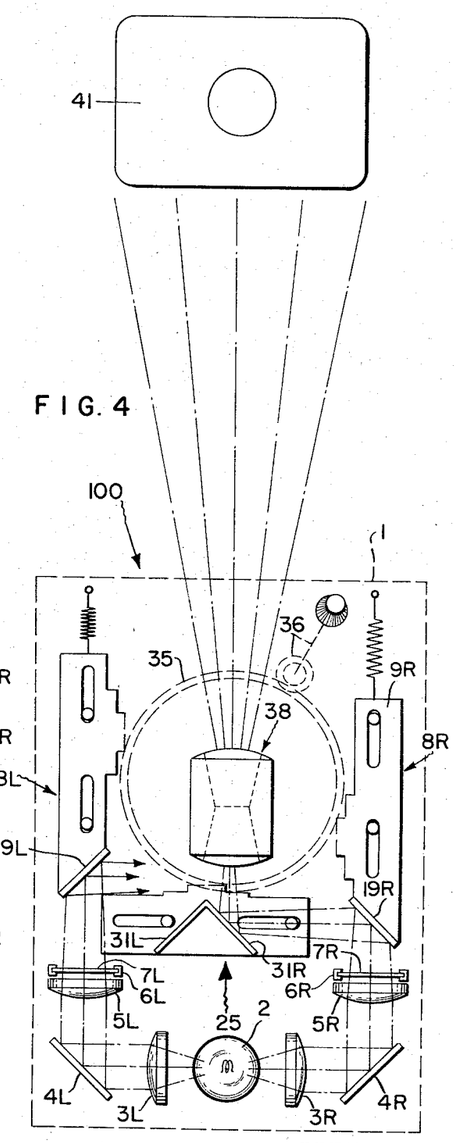

Referring now to FIG. 4, the gear 35 is shown as having been selectively rotated further clockwise. The mirror 19L has been moved completely out-of-line with the mirror 31L and the mirror 31L has been moved to the left completely out-of-line with the projecting lens system 38. Therefore, no light from the slide 7L is directed to the projecting lens system 38 and the CROSS has been removed from the viewing screen 41. At the same time, the mirror 19R has been moved towards the slide 7R into line with the mirror 31R, while the mirror 31R has been moved into line with the projecting lens system 38. Hence, substantially all the light transmitted by the side 7R is directed to the rojecting lens system 38 and projected on the viewing screen 41. Therefore, the image of the CIRCLE is shown in a solid line in FIG. 4.

In summary, it has been shown that by rotating clockwise, the gear wheel 35 from its position in FIG. 1 to its position in FIG. 4 that an infused transition occurs on the viewing screen 41 from the image of the slide 7L to the image of the slide 7R. The image of the CROSS on the slide 7L thus dissappears, while the image of the CIRCLE on the slide 7R is being infused on the viewing screen 41. This disappearance of the CROSS from the screen 41 thus takes place in a manner similar to but in a reverse direction to the infused transition which simultaneously occurred while the projected image of the CIRCLE of slide 7R is infused on the projected image of the CROSS. More specifically this unique fashion is accomplished by what may be termed a first movable light directing or mirror means including the mirrors 19L and 31L. These mirrors are moved equal distances along mutually perpendicular lines of travel and selectively define between the slide receiving compartment 6L and the projecting lens system 38 a first unobstructed constant length light path. In a similar manner, the infusion of the image of the CIRCLE on the screen 41 is accomplished by what may be termed a second movable light directing or mirror means including the mirrors 19R and 31R. These mirrors are also moved equal distances along mutually perpendicular lines of travel and selectively define a second unobstructed constant length light path between the slide receiving compartment 6R and the projecting lens system 38. It is noted that the gear 35 may be rotated counterclockwise from its position in FIG. 4 back to FIG. 1 position thereby to make a transition by infusion of a projected image of the slide 7L on the image of the slide 7R. With the projector 100, light is always being directed to the viewing screen 41 at light is always being directed to the viewing screen 41 at the same intensity so that the viewer will never experience a dark screen or the undesired fade in and fade out projecting image phenomena that is inherent in the previously mentioned projectors that employ a lap dissolve principle for changing slides.

In the projector 100, substantially all the light transmitted by he slides 7 is received and reflected by the respective mirrors 19. The transition by infusion provided by the projector 100 may thus be said to occur at the reflecting surfaces of the mirrors 31 since light reflected by the mirrors 19 is only selectively directed by the mirrors 31 to the projecting lens system 38. As is hereinafter explained, the extent to which this transition by infusion approaches a perfect infusion depends upon the proximity of the mirrors 31 to the node 43 of the lens system 38.

The make-up of the projected light beam at the node 43 must be examined in order to understand the nature of the transition by infusion provided by the projector 100. Recalling that light from all points of the filament 44 of the lamp 2 illuminates every point on the slide 7 and the filament 44 is imaged at the node 43, it follows that the projected image of the slide or slides 7 is completely out of focus at the node 43. Light from every point on the slide or slide 7 passes through every point of the plane of the node 43. It is apparent, then, if one would shutter part of the light beam at the node 43, that no part of the projected image would be cut-off, but rather the entire image would be uniformly dimmed to produce a perfect dissolve. In contrast, if the light transmitted by the slides 7 were instead shuttered at the film planes of the slide 7, a perfect line lap transition would be effected with the projected image being cut-off and wiped across the viewing screen 41.

In the projector 100, the light transmitted from the slides 7 to the lens system 38 is in effect "shuttered" at the reflecting surfaces of the mirrors 31. Since the mirrors 31 are located in the light paths between the film plane of the slides 7 and the node 43 of the lens system 38, it is apparent that the projector 100 provides neither a perfect line lap, nor a perfect lap dissolve transition. Rather, the projector 100 provides a transition by infusion which is a combination of the two effects.

In the projector 100, the mirrors 31 are intentionally located very close to the entrance of the projecting lens system 38. As a result, the distance from the mirrors 31 to the node 43 is small in comparison to their distance from the slides 7. Since the transition provided by the projector 100 is a transition by infusion a projected image can be readily removed and another image added to replace it without this image transferal being apparent to one viewing screen 41. It is additionally noted that by moving the mirrors 31 closer to the node 43 that their transition by infusion would enhance this transition while moving the mirrors 31 away from the node 41 and toward sthe slides 7 would make this transition more pronounced.

Figure 5:
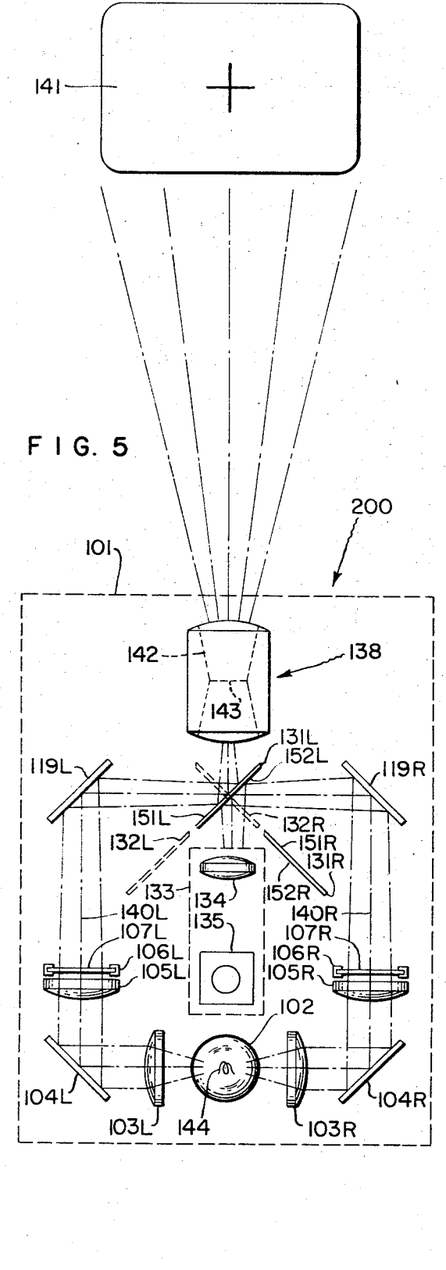
FIGS. 5 – 7 are top views of a second embodiment of a slide projector according to the present invention.
Figure 6:
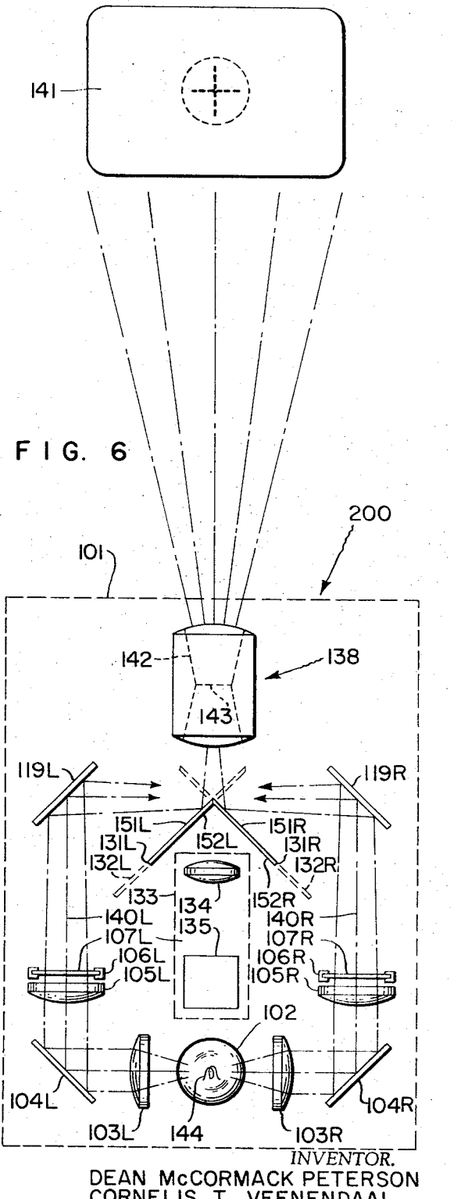
Figure 7:
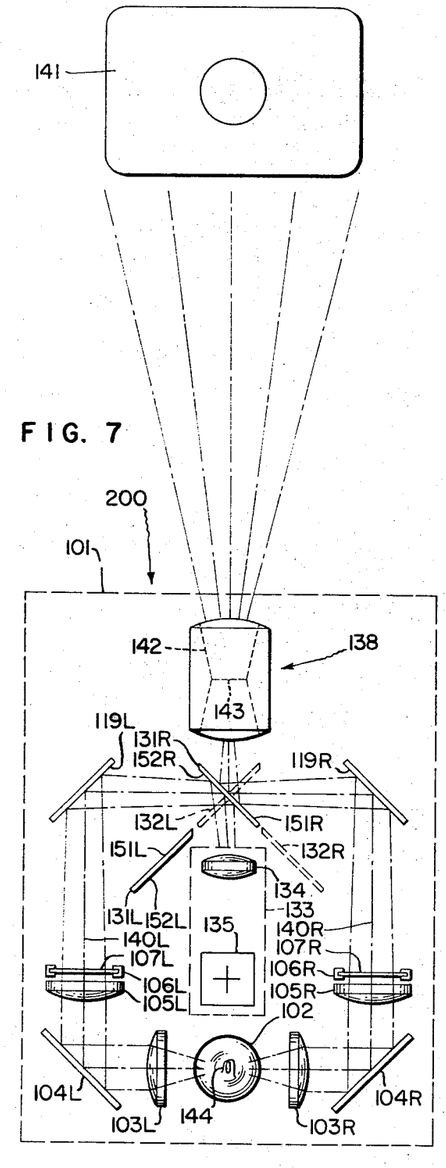

Referring to FIGS. 5-7, there is shown the basic elements of a slide projector 200 comprising a second embodiment of the present invention. The elements of the slide projector 200 are mounted in a projector housing 101 which is shown by broken lines. A light source such as a lamp 102 is centered at the rear portion of the housing 101. The lamp 102 has a filament 144. First and second light condensing lens systems are symmetrically positioned to the right and left sides of the lamp 102, as viewed in the drawings. Each condensing lens system includes lens 103, a mirror 104 and a lens 105. The optical elements of the right and left hand condensing lens systems are again identified respectively by the suffixes R and L. In each condensing lens systems the optical axes of the lenses 103 and 105 are substantially at right angles with respect to each other. The mirror 104 is positioned at an angle of 45° with respect to these axes so as to direct light from the lens 103 to the lens 105. The optical axis of each condensing lens system is coincident with the optical axis of the associated lens 105.

Slide receiving compartments 106R and 106L are positioned, respectively, immediately adjacent the lenses 105R and 105L. Photographic slides 107R and 107L are shown placed in the slide receiving compartments 106R and 106L, respectively. The slides 107R and 107L are positioned by the compartments 106R and 106L across and perpendicular to the axes of the respective condensing lens systems. For purposes of illustration, the slide 107R carries only the picture of a CIRCLE while the slide 107L carries only the picture of a CROSS.

Positioned beyond the slide receiving compartment 106R and across the axis of the right condensing lens system is a fixedly mounted mirror 119R. The mirror 119R has a plane reflecting surface and is mounted on the housing 101 so that its plane reflecting surface makes an angle of 45° with the axis of the right hand condensing lens system. In a similar manner, a fixed mirror 119L is mounted on the housing 101 beyond the slide compartment 106L.

Movably positioned at the front portion of the projector housing 101 are a pair of plane mirrors 131R and 131L. The mirror 131R has on its front and back faces plane and parallel reflecting surfaces 151R and 152R, respectively. The reflecting surfaces 151R and 152R are back-to-back with respect to each other. Similarly, the mirror 131L has plane and parallel reflecting surfaces 151L and 152L on its front and back faces, respectively. The mirrors 131 are mounted on positioning means 145 shown in FIGS. 8a. The mirror 131R is mounted on the positioning means 145 so that the reflecting surfaces 151R and 152R are parallel to the reflecting surfaces of the mirror 119R. The mirror 131L is mounted in a similar manner on the positioning means 145 so that the reflecting surfaces 151L and 152L are parallel to the reflecting surface of the mirror 119L. The positioning means 145 is discussed in greater detail hereinafter and is selectively operable to position the mirrors 131R, 131L along the paths of travel defined, respectively, by the broken lines 132R, 132L. The paths 132R and 132L are defined so as to be mutually perpendicular and to cross each other at the center line of the housing 101. The path 132R is parallel to the plane of the reflecting surface of the mirror 119R and the path 132L is parallel to the plane of the reflecting surface of the mirror 119L.

Figures 8A, 8B, 8C:
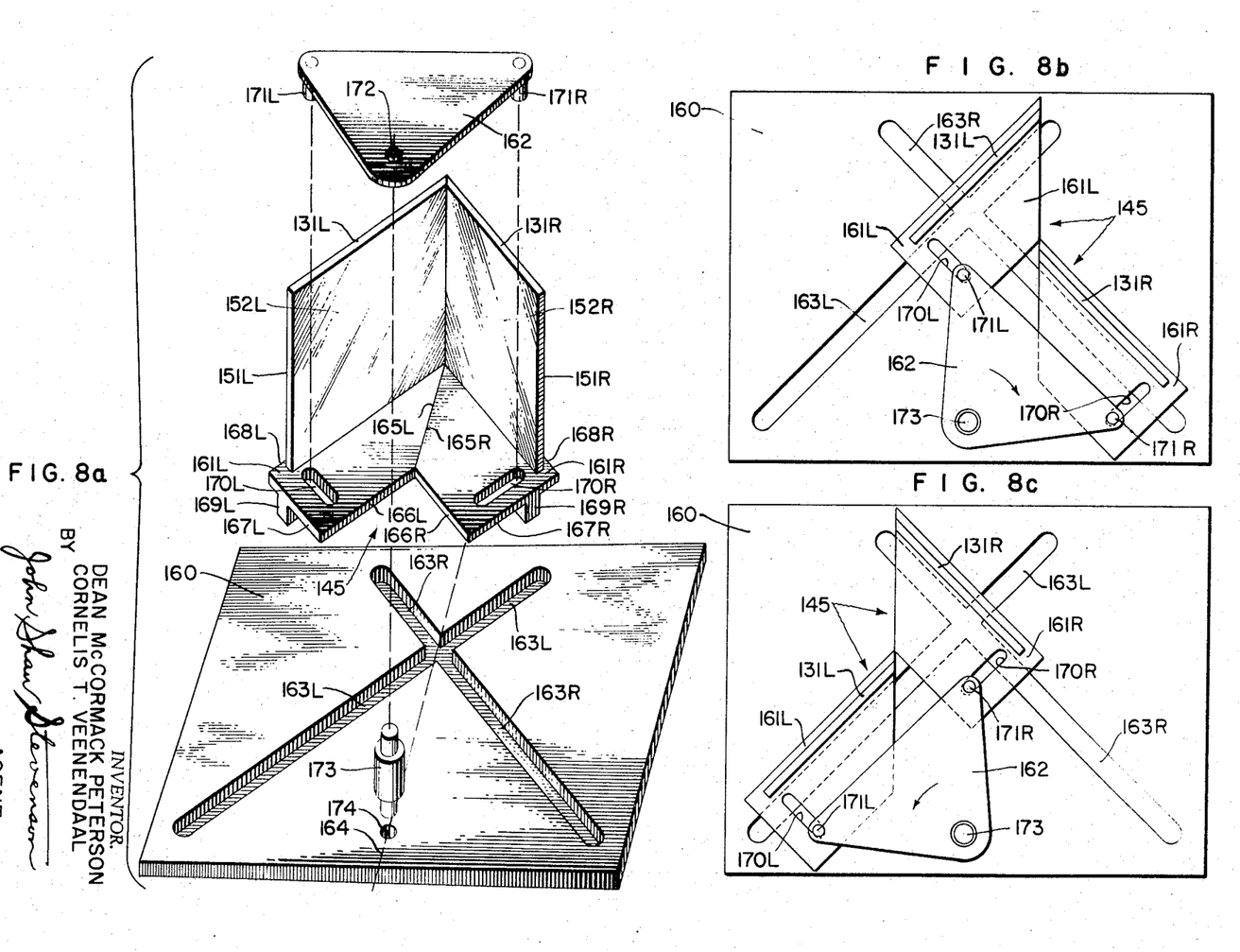
FIGS. 8a, 8b, and 8c are, respectively, an exploded perspective view and two top views of means for positioning the movable mirrors of the slide projector shown in FIGS. 5 – 7.

Referring now to FIG. 8a, there is shown an exploded view of one form of positioning means 145 suitable for use in carrying out the present invention. The illustrated positioning means 145 comprises a rectangular plate 160, right and left planar members 161R, 161L and a pivotable member 162. The plate 160 has a center line 164 and is mounted on the projector housing 101 so that the center line 164 is coincident with the center line of the housing 101. Crossing grooves 163R and 163L are formed in the plate 160 at right angles to each other. The grooves 163R and 163L are symmetrically formed about the center line 164 of the plate 160 and define mutually perpendicular paths of travel for the planar members 162R and 161L.

The planar members 161T and 161L are each trapezoids similarly dimensioned except that the member 161R is constructed for the right side of the positioning means 145 while the member 161L is constructed for the left side. The planar member 161R has edges numbered counter-clockwise 165R-168R while the member 161L has edges numbered clockwise 165L-168L. In each of the members 161R and 161L, their associated edges 166 and 168 are parallel with each other and their edges 167 make right angles with their edges 166 and 168. Also in each of the members 161R and 161L, their edges 165 make an angle of 135° with the edges 166 and an angle of 45° with the edges 168.

The planar members 161R and 161L are arranged to carry the mirrors 131R and 131L, respectively, and are slidably mounted on the plate 160 so that the edges 165R and 165L slide against each other. As shown in FIG. 8a, the members 161 each have runners 169 mounted on their lower surface. The runners 169 are mounted parallel to the edges 168 and fit into the associated grooves 163. Mounted on the upper surface of the members 161 are the mirrors 131. The mirror 131R is positioned on the member 161R with the reflecting surfaces 151R and 152R parallel to the edge 168R and perpendicular to the plane of the member 161R. Likewise the mirror 131L is positioned on the member 161L with the reflecting surfaces 151L and 152L parallel to the edge 168L and perpendicular to the plane of the member 161L. As shown in FIG. 8a, the mirrors 131 are mounted on the respective planar members 161 so that one tapered end of each of these mirrors just touches their associated edges 165L, 165R so that these associated ends of the mirrors 131 contact each other when they are in the position as shown in FIG. 8. The planar members 161R and 161L further have slots 170R and 170L cut therein, respectively. The slots 170 are cut at right angles to the edges 166 and 168 and their function is explained below.

The pivotable member 162 is an isosceles triangular planar member having a pivot point 172 at the apex corner thereof. A downward projecting pin 171R is mounted on the right base corner of the member 162. Similarly, mounted on the left base corner of the member 162 is a downward projecting pin 171L. As shown in FIG. 8a and 8b, the pins 171R and 171L are fitted into the slots 170R and 170L. The center line of a pin means 173 that passes thru member 162 and into plate 160 forms the common axis extending thru the pivot points 172, 174 and thru the center line 164 of the plate 160. The component parts of the positioning means 145 are appropriately dimensioned so that the perpendicular paths of travel 132R and 132L are defined, respectively, for the mirrors 131R and 131L. As is explained hereinafter, the positioning means 145 is selectively operable by positioning the member 162, thereby to simultaneously position the mirrors 131 along their respective lines of travel.

Referring again to FIG. 5, a conventional projecting lens system 138 is mounted along the center line of the projector 200. The lens system 138 is mounted so that its optical axis is parallel with and lies substantially in a common plane with the optical axes of the right and left hand condensing lens systems. The effective light path defined by the lens system 138 is indicated by the broken lines 142. the node of the lens system 138 is indicated by the broken line 143.

Figure 9:
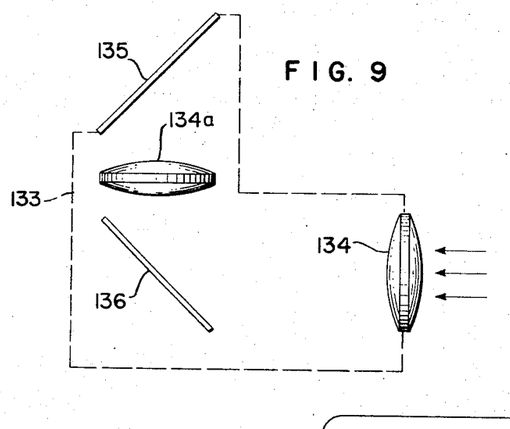
FIG. 9 is a side view of an arrangement for previewing slides placed in the slide projector shown in FIGS. 5 – 7.

Positioned near the center of the housing 101 is a slide previewing means 133. The previewing means 133 is positioned along the center line of a housing 101 so as to receive light reflected from the back reflecting surfaces 152R, 152L of the mirrors 131R, 131L. The previewing means 133 is shown in more detail in FIG. 9 and includes a rear projection previewing screen 135, such as a ground glass plate, and light directing means comprised of a lens 134, a mirror 136 and lens 134a. The lens 134 is positioned with its optical axis on the center line of the housing 101 and coaxial with the projecting lens system 138, thereby to receive light from the back reflecting surfaces 152R and 152L of the mirrors 131R and 131L. The mirror 136 has a plane reflecting surface and is positioned with its reflecting surface at an angle of 45° with respect to the axis of the lens 134. The previewing screen 135 and lens 134a is positioned directly above the mirror 136 in a conventional manner so that a light path having a fixed length is defined between the slide to be previewed and the previewing screen 135. The focal length of the lens 134 is appropriately selected such that an image of either of the slides 107 may be formed on the screen 135. Thereby, means are provided for previewing the next slide to be projected.

The projector 200 operates in substantially the same manner as the hereinbefore described projector 100. Light from the lamp 102 is collected by the right and left hand condensing lens systems and formed in converging light beams 140R and 140L, respectively. The slides 107R and 107L are illuminated by the respective light beams 140R and 140L. Light from substantially all points on the filament 144 of the lamp 102 illuminates every point on each of the slides 107R and 107L since the slides are located immediately adjacent the lenses 105R and 105L.

In FIG. 5, the mirrors 131 are illustrated as being positioned by the positioning means 145 as shown in FIG. 8b. The mirror 131L is positioned at the right limit of its path of travel 132L across the axis of the projecting lens system 138 and in-line with mirrors 119. Substantially all the light transmitted by the slide 107L and reflected by the mirror 119L is then directed by the reflecting surface 151L to the projecting lens system 138. The projecting lens system 138 is focused so as to form an image of the slide 107L on a viewing screen 141 and hence, the CROSS on the slide 107L is projected onto the screen 141. At the same time, light transmitted by the slide 107R is reflected by the mirror 119R and the reflecting surface 152L to the previewing means 133. Consequently, light from the slide 107R is received by the lens 134 and an image of the CIRCLE on the slide 107R is formed on the previewing screen 135. It is noted that in FIG. 5 the mirror 131R is positioned at the right limit of its path of the travel 132R completely out-of-line with the mirrors 119. Therefore, the mirror 131R is not being used and no light is being reflected thereby.

In FIG. 6, the mirrors 131L and 131R are shown in an in-termediate position, respectively, to the left and right of the axis of the projecting lens system 138. This positioning of the mirrors 131 corresponds to the position of the positioning means 145 as shown in FIG. 8a. This position occurs when the positioning means 145 has been moved to a position where the planar members 161L and 161R are symmetrically oriented with respect to the center line 164 by rotating the pivotable member 162 counterclockwise from its position shown in FIG. 8b. The action of the pins 171 in the slots 170 operates to slide the planar member 161L and its associated runner 169L down and to the left in groove 163L while sliding the planar member 161R up and to the left in groove 163R. The mirrors 131L and 131R are both moved to the left in their planes of travel defined by the paths 132L and 132R until they are substantially half in-line and half out-of-line with respect to the mirrors 119 and the projecting lens system 138. During the movement a certain amount of light directed from the slide 107L to the viewing screen 141 is thus cut off while at the same time an increase in the quantity of light equal to the amount cut off is directed from the slide 107R to the viewing screen 141 with the result that images of both the CROSS and CIRCLE are formed on the screen 141. The CROSS and CIRCLE have been shown in broken lines in FIG. 6 to indicate that the image they form is bright and of a desired fixed intensity. It is noted that, with the mirrors 131R and 131L positioned as shown in FIG. 6, the light paths to the back reflecting surfaces 152R and 152L are blocked so that no light is reflected to the previewing means 13. The previewing screen 135 is thus dark for a split instant of time as shown in FIG. 6 while the mirrors 131L, 131R are moved between their solid line positions shown in FIGS. 5 and 7.

Referring now to FIG. 7, the mirror 131L is shown as having been moved to the left limit of its path of travel 132L, completely out-of-line with the mirror 119L. At the same time, the mirror 131R has been moved across the axis of the projecting lens system 138 and in-line with the mirror 119R. This positioning of the mirrors 131 corresponds to the position of the positioning means 145 as shown in FIG. 8c and may be accomplished by rotating the pivotable member 162 counterclockwise from its position shown in FIG. 8a. The action of the pins 171 in the slots 170 operates to slide the planar member 161L down and to the left of the center line 164 while sliding the planar member 161R up across the center line 164. No light is now directed by the mirror 131L since it is not in-line with either of the mirrors 119. Substantially all the light transmitted through the slide 107R, however, is now directed to the projecting lens system 138 by the reflecting surface 151R and the image of the CIRCLE is projected onto the screen 141. At the same time light from the slide 107L is directed off the back reflecting surface 152R to the previewing means 133 and the image of the CROSS is formed on the previewing screen 135.

In summary, it has been shown that by rotating the pivotable member 162 of the positioning means 145 counterclockwise that the mirrors 131R and 131L may be selectively moved from their position in FIG. 8b to their position in FIG. 8c. Thereby, a transition by infusion is caused to occur on the viewing screen 141 from the image of the slide 107L to the image of the slide 107R. The removal of the image of the CROSS from the viewing screen 141 is accomplished by what may be termed a first movable light directing or mirror means comprised of the movable mirror 131L. The mirror 131L is moved by the positioning means 145 along a line of travel parallel to the reflecting surface of the mirror 119L. Thus, the reflecting surface 151L is moved in the plane it defines and the perpendicular distance between the plane of the reflecting surface of the mirror 119L and the plane of the reflecting surface 151L remains substantially constant. Thereby, a first unobstructed constant length light path is selectively defined between the slide receiving compartment of gate 106L and the projecting lens system 138. In a similar manner, the infusion of the image of the CIRCLE on the screen 141 is simultaneously accomplished by what may be termed a second movable light directing or mirror means comprised of the mirror 131R. The mirror 131R is moved by the positioning means 145 along a line of travel parallel to the reflecting surface of the mirror 119R, thereby to selectively define a second unobstructed constant length light path between the slide receiving compartment of gate 106R and the projecting lens system 138. It is noted that by moving the pivotable member 162 from its position in FIG. 8c clockwise to its position in FIG. 8b that a transition by infusion may be made during the shift from the image of the slide 107R back to the image of the slide 107L. The projector 200 also projects the image of the slide not being shown in the show screen 141 by means of the reflecting surfaces 152R or 152L to the previewing means 133.

In the projector 200, substantially all light transmitted by the slides 107 is received and reflected by the respective mirrors 119. The transition by infusion provided by the projector 200 thus occurs at the reflecting surfaces 151R and 151L of the mirrors 131 since light reflected by the mirrors 119 is only selectively directed by the mirrors 131 to the projecting lens system 138. Therefore, light transmitted from the slides 107 to the lens system 138 is in effect "shuttered" at the reflecting surfaces 151R and 151L. Since the mirrors 131 are located in the light paths between the film plane of the slides 107 and the node 143 of the lens system 138, it is apparent that, in the projector 200 as in the projector 100 an infusion or an even flow of the image at a constant intensity occurs rather than line lap or a lap dissolve transition. The projector 200 thus provides a transition by by infusion which eliminates the distracting and light intensity fading effect of presently available line lap and lap dissolve projectors. Since, in the projector 200, the distance from the mirrors 131 to the node 143 is small in comparison to their distance from the slides 107 no distration of the projected image will be present while a first projected image is replaced by infusing a second image thereon in the projector 200.

Figure 10:
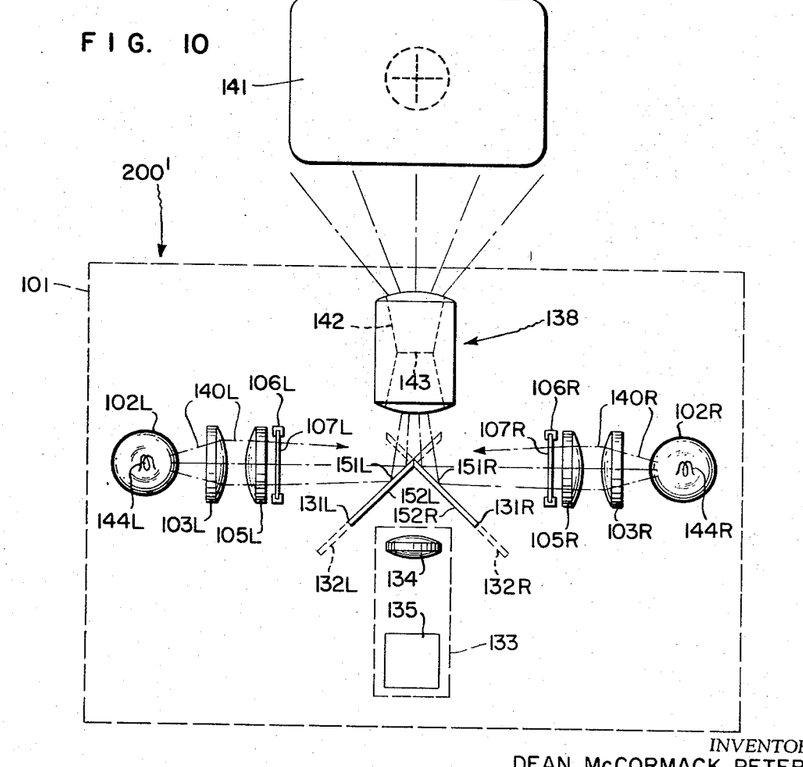
FIG. 10 is a top view of an alternate form of the slide projector shown in FIGS. 5 – 7.

Referring to FIG. 10, a slide projector 200' is shown therein. The projector 200' employs as a light source first and second lamps 102R and 102L for forming respectively, the light beams 140R and 140L. The projector 200', with the exception of the dual lamp light source, is similar in all significant respects to the previously described projector 200 and has its components numbered to conform with the numbering of the projector 200. Since two lamps are used in the projector 200', the mirrors 104 and 119 employed in the projector 200 are not necessary. Additionally in the projector 200', the optical axes of the right and left hand condensing lens systems are coaxial, and the projecting lens system 138 is mounted so that its optical axis is perpendicular to the axes of the right and left hand condensing lens systems. The axes of the right and left hand condensing lens systems and the projecting lens system 138 lie in a common plane and intersect in a common point located at the intersection of the paths of travel 132R and 132L defined, respectively, for the mirrors 131R and 131L. The projector 200' is shown with the mirrors 131R and 131L selectively positioned so as to form images of the CROSS and CIRCLE on the screen 141. With the exceptions above noted, the description of the operation of the projector 200 is also applicable to the projector 200'.

Figure 11:
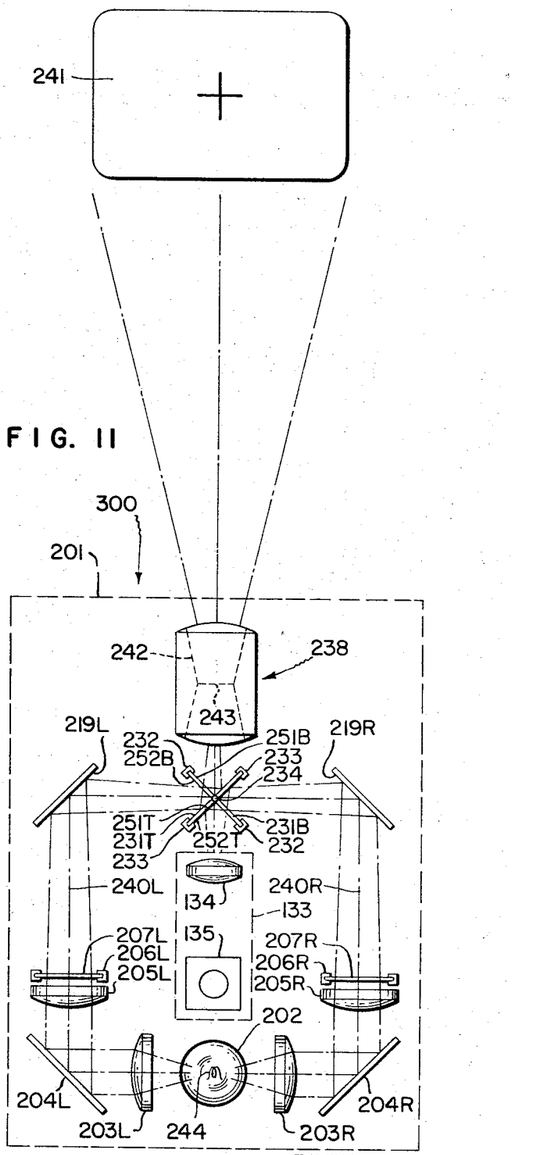
FIG. 11 is a top view of a third embodiment of a slide projector according to the present invention.

Referring to FIG. 11, there is shown the basic elements of a slide projector 300 which comprises a third embodiment of the present invention. The elements of the slide projector 300 are mounted in a projector housing 201 which is shown by broken lines. A light source including a lamp 202 is centered at the rear portion of the housing 201. The lamp 202 has a filament 244. First and second light condensing lens systems are symmetrically positioned on the right and left hand sides of the lamp 202. Each condensing lens system is comprised of a lens 203, a mirror 204 and a lens 205. The optical elements of the right and left hand condensing lens systems are identified, respectively, by the suffixes R and L. Each condensing lens system is constructed in a manner substantially identical with the hereinbefore described right and left hand condensing lens systems of the projector. The optical axis of each condensing lens system in the projector 200 is coincident with the axis of the associated lens 205.

Slide receiving compartments 206R and 206L are positioned immediately adjacent the lenses 205R and 205L, respectively, and photographic slides 207R and 207L are shown placed therein. The slide 207R carries only the picture of a CIRCLE while the slide 207L carries only the picture of a CROSS.

Positioned beyond the slide receiving compartment 206R and across the axis of the right condensing lens system is a fixedly mounted mirror 219R. The mirror 219R has a plane reflecting surface and is mounted on the housing 201 so that its plane reflecting surface makes an angle of 45° with the axis of the right condensing lens system. In a similar manner, a fixed mirror 219L is mounted on the housing 201 behind the slide compartment 206L.

Figure 12:
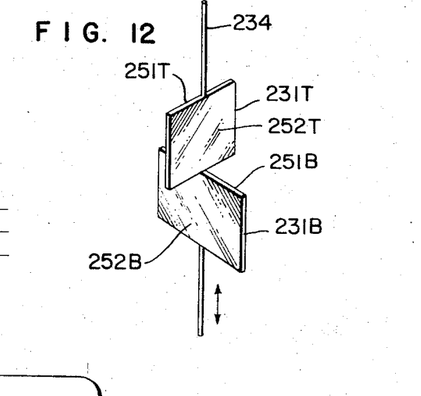
FIG. 12 is a perspective view of the movable mirrors of the slide projector shown in FIG. 11.

Plane mirrors 231T and 231B are movable between the mirrors 219R and 219L across the center line of the housing 201. The mirror 231T has on its front and back faces plane and parallel reflecting surfaces 251T and 252T, respectively. The reflecting surfaces 251T and 252T are back-to-back with respect to each other. Similarly, the mirror 231B has plane and parallel reflecting surfaces 251B and 252B on its front and back faces, respectively. As shown in FIG. 12, the mirror 231T is mounted immediately above the mirror 231B with the reflecting surfaces of the mirror 231T being positioned at right angles to the reflecting surfaces of the mirror 231B. A shaft 234 runs vertically through the center of the mirrors 231, thereby to hold the mirrors in a fixed vertical position with respect to each other. While the vertical shaft 234 has here been described as a means of holding the two mirrors together and vertical, any suitable means may be used such as edge frames (not shown).

As shown in FIG. 11, the mirror 231T is positioned in a set of vertical guides 233 while the mirror 231B is positioned in similar vertical guides 232. The guides 233 are mounted on the housing 201 so as to define for the mirror 231T a vertical path of travel in which its reflecting surfaces 251T and 252T are at all times maintained parallel to the reflecting surface of the mirror 219L. The guide means 232 are mounted in a similar manner on the housing 201 so that a vertical path of travel is defined for th mirror 231B whereas the reflecting surfaces 251B and 252B are maintained parallel to the reflecting surface of the mirror 219R. It is to be noted that the guide means 232 and 233 are constructed so as to hold the mirrors 231B and 231T, respectively, in the positions to which the mirrors 231 are selectively moved. The mirrors 231 may be selectively positioned in the respective guide means 232 and 233, as is hereinafter explained, from a lower position whereat the mirror 231T is inline with the mirrors 219 to an upper position whereat the mirror 231B is in-line with the mirror 219.

A projecting lens system is mounted at the front of the projector 300 along its center line. The lens system 238 is mounted with its optical axis parallel and substantially in a common plane with the optical axes of the right and left condensing lens systems. The effective light path defined by the lens system 238 is indicated by the broken lines 242. The node of the lens system 238 is indicated by the broken line 243. A slide previewing means substantially identical to the slide previewing means 133 of the projector 200 is positioned along the center line of the housing 201 so as to receive light reflected from the back reflecting surfaces 252T and 252B of the mirrors 231T and 231B. This previewing means is again designated 133 and has its component parts in the previewing means of the projector 200.

The projector 300 operates in substantially the same manner as the projector 200. Light from the lamp 202 is formed by the right and left hand condensing lens systems into light beams 240R and 240L, thereby to illuminate slides 207R and 207L, respectively. Since the slides 207 are located immediately adjacent the lenses 205, light from substantially every point on the filament 244 illuminates all points of the slides 207.

Figure 13A:
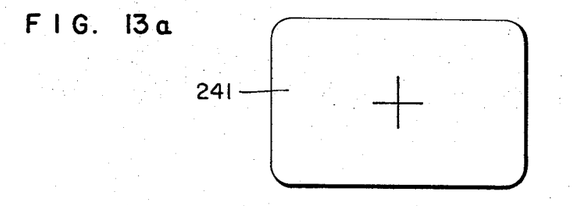
FIGS. 13a, b and c show the viewing screen associated with the slide projector shown in FIG. 11.

With the mirrors 251 positioned in their lower position, the mirror 251T is positioned in-line with the mirrors 219 while the mirror 251B is positioned below and out-of-line with the mirrors 219. Light transmitted by the slide 207L is reflected by the mirror 219L and the reflecting surface 251T to the projecting lens system 238. Consequently, the image of the CROSS on the slide 207L is projected on the viewing screen 241 as shown in FIG. 13a. At the same time, the light transmitted by the slide 207R is reflected by the mirror 219R and the reflecting surface 252T to the slide previewing means 133. The image of the CIRCLE on the slide 207R is projected on the previewing screen 135.

Figure 13B:
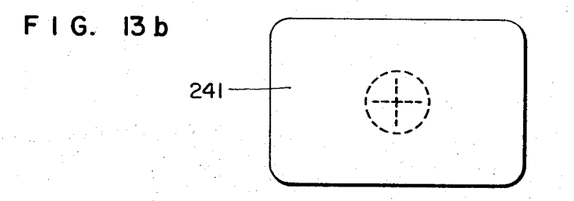

To accomplish a transition by infusion the mirrors 231 may be selectively repositioned along their vertical lines of travel. At one instant in such repositioning, the mirrors 231 reach the point where they are each half in-line and half out-of-line with the mirrors 219. At this instant, light of equal intensity from each of the slides 207 is reflected by the reflecting surfaces 251T and 251B to the projecting lens system 238. Consequently, images of the CROSS and CIRCLE on the slides 207L and 207R, respectively, are projected on the viewing screen 241 as show in FIG. 13b. These images are shown in broken lines in FIG. 13b since they are of substantially equal intensity. At the same time, light of equal intensity from each of the slides 207 is also reflected by the reflecting surfaces 252T and 252B to the previewing means 133. Images of equal intensity of the CROSS and CIRCLE are formed on the previewing screen 135.

Figures 13C, 14:
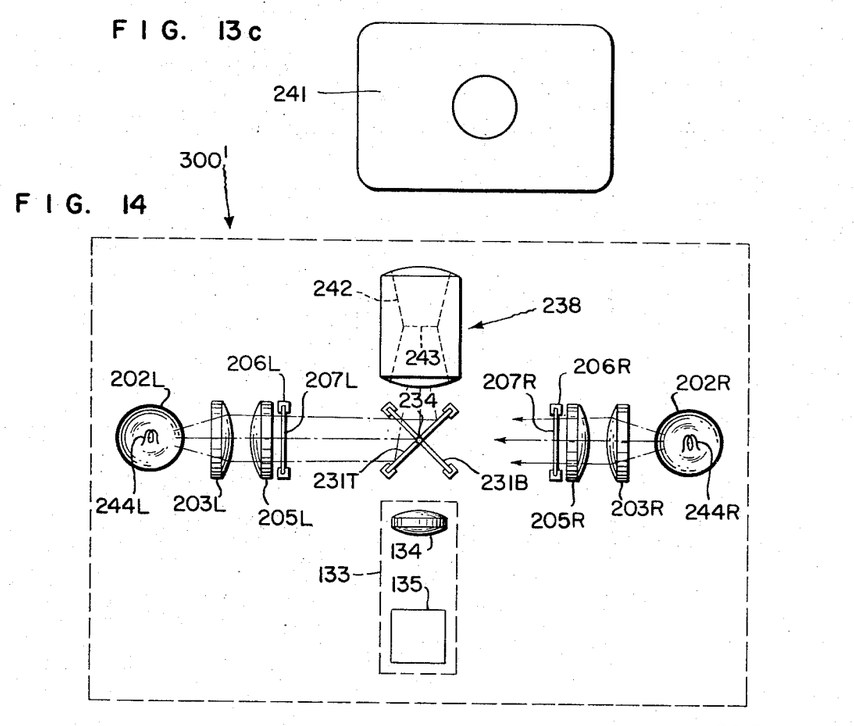

When the mirrors 131 reach their upper position, the mirror 251B is positioned in-line with the mirrors 219 while the mirror 251T is positioned above and out-of-line with the mirrors 219. Light transmitted by the slide 207R is reflected by the mirror 219R and the reflecting surface 251B to the projecting lens system 238. As a result, the image of the CIRCLE on the slide 207R is projected on the screen 241 as shown in FIG. 13c. Simultaneously, light transmitted by the slide 207L is reflected by the mirror 219L and the reflecting surface 252B to the previewing means 133. Thus, the image of the CROSS on the slide 207L is projected on the previewing screen 135.

In summary, it has been shown that by moving the mirrors 231 from their lower position to their upper position that a transition by infusion is caused to occur on the screen 241 from the image of the slide 207L to the image of the slide 207R. The mirror 231T is moved along a line of travel parallel to the reflecting surface of the mirror 219L. Thus, the reflecting surface 251T is moved in the plane it itself defines and the perpendicular distance between the plane of the reflecting surface of the mirror 219L and the plane of the reflecting surface 251T remains substantially constant. Thereby, a first unobstructed constant length light path is selectively defined between the slide receiving compartment 206L and the projecting lens system 238. Likewise, the mirror 231B is moved along a line of travel parallel to the reflecting surface of the mirror 219R to selectively define a second unobstructed constant length light path between the slide receiving compartment 206R and projecting lens system 238. By repositioning the mirrors 231 back to their lower position, a transition may be made back to the image of the slide 207L. The projector 300 also forms on the previewing screen 135 the image of the slide next to be selectively projected on the viewing screen 241.

It can thus be seen that since the movable mirrors 231 are located in close proximity to the node 243 of the lens system 238 in comparison to their distance from the slides 207, a transition by infusion is provided.

Referring to FIG. 14, a slide projector 300' is shown therein. The projector 300' employs as a light source first and second lamps 202R and 202L for forming, respectively, the light beams 240R and 240L. The projector 300' with the exception of the dual beam light source, is similar in all significant respects to the previously described projector 300 and has its components numbered to conform with the numbering of the projector 300. Since two lamps are used in the projector 300', the mirrors 204 and 219 employed in the projector 300 are not necessary. Additionally, in the projector 300' the optical axes of the right and left hand condensing lens systems are coaxial, and the projecting lens system 238 is mounted so that its optical axis is perpendicular to the axes of the right and left hand condensing lens systems. The axes of the right and left hand condensing lens systems and the projecting lens systems 238 lie in a common plane and intersect in a common point located on the shaft 234. The description of the operation of the projector 300, with the exceptions above noted is also applicable to the projector 300'.

Thus, there has been provided a slide projector which is capable of producing substantially a transition by infusion from one photographic slide to another. Several embodiments of such a slide projector are shown and in each of these embodiments first and second movable mirror means are selectively positioned alternately so that while one mirror means is being moved so as to remove a projected scene from a viewing screen, the other mirror means is being simultaneously moved so as to infuse another scene in its place. Each of the several embodiments of the slide projector shown are characterized by their compact construction and ease of operation. Certain embodiments of the slide projector are shown with means for previewing the photographic slide next to be projected.

It is to be noted that while the projectors shown and described herein have included the two optical paths as lying in a horizontal plane with the paths being identified as right and left optics, it will be appreciated that the two optical paths may be oriented in a vertical plane without departing from the spirit and scope of the present invention.

The embodiments of the invention in which an exclusive property or privilege is claimed are defined as follows:

1. An optical projector, comprising means for providing a first and a second light beam, each of said light beams having separate axes that extend along a common plane,
   a first film gate positioned in the path of said first light beam whereby a first optical object placed in said first film gate is illuminated by said first light beam;
   a second film gate positioned in the path of said second light beam whereby a second optical object placed in said second film gate is illuminated by said second light beam;
   an optical projecting system;
   first and second light beam directing means operably connected for alternate criss'cross movement into a position intermediate said projecting system and said first and second film gates, respectively, for selectively directing said first and second beams through the projecting system,
   said optical projecting system and said first and second light beam directing means coacting simultaneously to remove and replace by infusion the projected image of one of said optical objects with the projected image of the other optical object and wherein each of said first and second light beam directing means is provided with a pair of reflecting faces, one face of each pair of reflecting faces being operably positioned to provide surfaces against which the second and first beams can be sequentially directed through a second optical projecting system to a preview screen while the other face of each of the reflecting faces are operably positioned to provide another surface against which the first and second beams can be sequentially directed through said first projecting system to a show screen.

2. An optical projector, comprising means for providing a first and a second light beam, each of said light beams having separate axes that extend along a common plane,
   a first film gate positioned in the path of said first light beam whereby a first optical object placed in said first film gate is illuminated by said first light beam;
   a second film gate positioned in the path of said second light beam whereby a second optical object placed in said second film gate is illuminated by said second light beam;
   an optical projecting system;
   first and second light beam directing means operably connected for alternate movement into a position intermediate said projecting system and said first and second film gates, respectively, for selectively directing said first and second beams through the projecting system,
   said optical projecting system and said first and second light beam directing means coacting simultaneously to remove and replace by infusion the projected image of one of said optical objects with the projected image of the other optical object and wherein the light beam directing means is comprised of a pair of first and second members each operably connected for slidable criss'cross movement with respect to one another with a different one of two planar members between light beam projecting and non projecting positions.

3. An optical projector, comprising means for providing a first and a second light beam, each of said light beams having separate axes that extend along a common plane, a first film gate positioned in the path of said first light beam whereby a first optical object placed in said first object film gate is illuminated by said first light beam;

a second film gate positioned in the path of said second light beam whereby a second optical object placed in said second film gate is illuminated by said second light beam;

an optical projecting system;

first and second light beam directing means operably connected for alternate movement into a position intermediate said projecting system and said first and second film gates, respectively, for selectively directing said first and second beams through the projecting system, said optical projecting system and said first and second light beam directing means coacting simultaneously to remove and replace by infusion the projected image of one of said optical objects with the projected image of the other optical object and wherein the light beam directing means is comprised of a pair of first and second members each operably connected for slidable criss-cross movement with a separate one of two planar members between light beam projecting and non projecting positions, said planar members each being operably connected for joint slidable criss-cross movement on a stationary base member and wherein a mechanically movable oscillatable means is employed to move said planar members in opposite directions and in said criss-cross direction along said stationary base member.

4. An optical projector, comprising means for providing a first and second light beam, each of said light beams having separate axes that extend along a common plane, a first film gate positioned in the path of said first light beam whereby a first optical object placed in said first film gate is illuminated by said first light beam;

a second film gate positioned in the path of said second light beam whereby a second optical object placed in said second film gate is illuminated by said second light beam;

an optical projecting system;

first and second light beam directing means operably connected for alternate movement into a position intermediate said projecting system and said first and second film gates, respectively, for selectively directing said first and second beams through the projecting system;

said optical projecting system and said first and second light beam directing means coacting simultaneously to remove and replace by infusion the projected image of one of said optical objects with the projected image of the other optical object and wherein the light beam directing means is comprised of a pair of first and second members each operably connected for slidable movement with a separate one of two planar members in a criss'cross direction with respect to one another between light beam projecting and non projecting positions, said planar members being operably connected for said joint slidable criss'cross movement on a stationary base member, and wherein a solenoid actuated plate in the shape of an equilateral triangle is operably connected to the planar members to introduce said back and forth criss'cross motion thereto.

* * * * *